Patented Aug. 15, 1950

2,519,295

UNITED STATES PATENT OFFICE 2,519,295

PEAK-TO-PEAK DETECTOR

Francis H. Shepard, Jr., Madison, N. J., assignor, by mesne assignments, to Remco Electronic, Inc., New York, N. Y., a corporation of New York Application November 15, 1944, Serial No. 563,574

11 Claims. (Cl. 250—27)

The object of my invention is to provide a method of and apparatus for eliminating or reducing excessive ripple in the output of a peak-to-peak detector while at the same time retaining fast response to sudden changes of signal to be detected.

A feature of my invention is the use of a neon tube in a peak-to-peak detector for this purpose. According to the present invention, a peak-to-peak detector is provided having an output circuit of extremely long time-constant, preferably constituted by a condenser with no bypass resistor. In conventional systems such an output circuit would be completely inoperative since, once charged, the condenser would retain its charge and its voltage could not follow reductions in input signal. According to the present invention, further means are provided for causing the output voltage to follow quickly any changes in input voltage.

These and other advantages and objects of the present invention will become more apparent upon consideration of the following description and appended drawings, in which.

The present invention is particularly useful in connection with a system for detecting square waves and especially such systems in which the length of the marking state or the spacing state or both are varied according to respective intelligences to be transmitted and received. Such a system is illustrated, for example, in my pending application Serial No. 563,569, filed November 15, 1944, now Patent No. 2,455,617. As shown in this application, one form of receiver for such a system utilizes a peak-to-peak detector, making use of diode electron tubes. Such diode peak-to-peak detector circuits operate satisfactorily so long as the rate of change of the intelligence transmitted is slow compared to the repetition frequency of the pulses of the square waves.

Because of certain limitations in carrier apparatus it is desirable in such intelligence transmission systems to use square waves of as low frequency as possible. When this is done, undesirable ripple voltages appear across the output circuit, which may be of such amplitude and frequency as to cause spurious response in devices coupled to the output of such detectors, even when no change of the intelligence is actually taking place.

Figure 1:
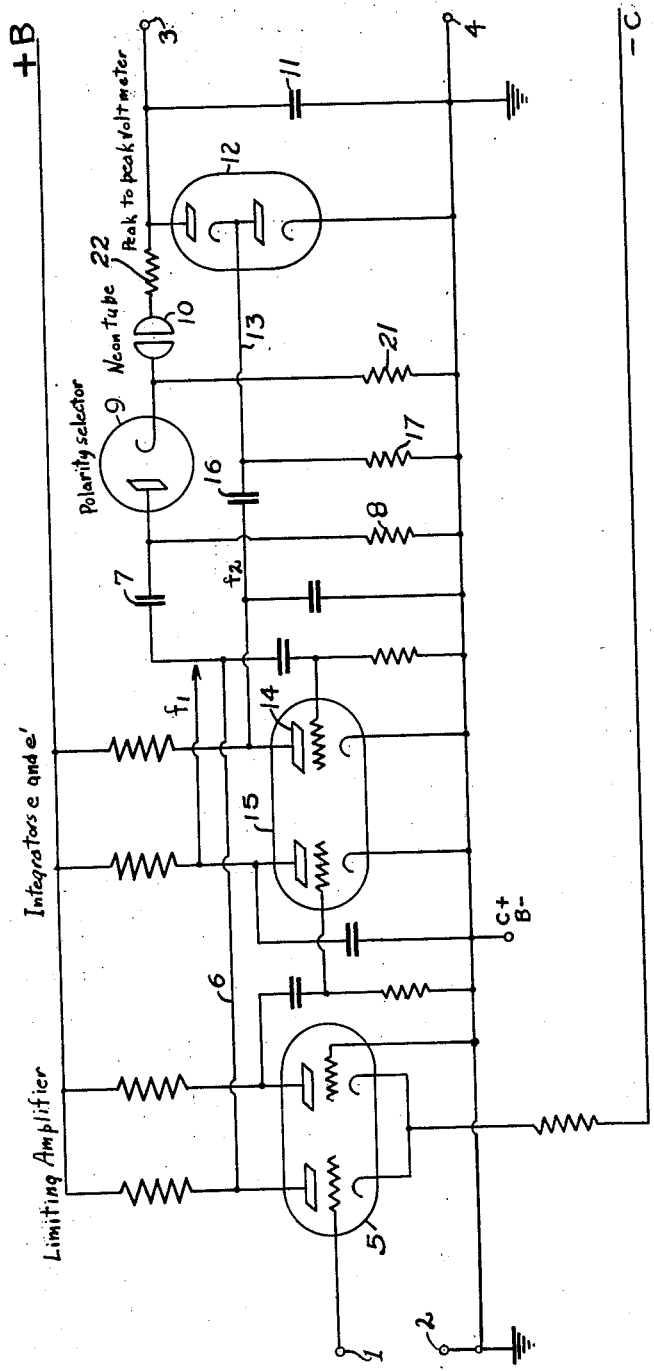
Figure 1 is a circuit diagram illustrating the invention.
Figure 2:
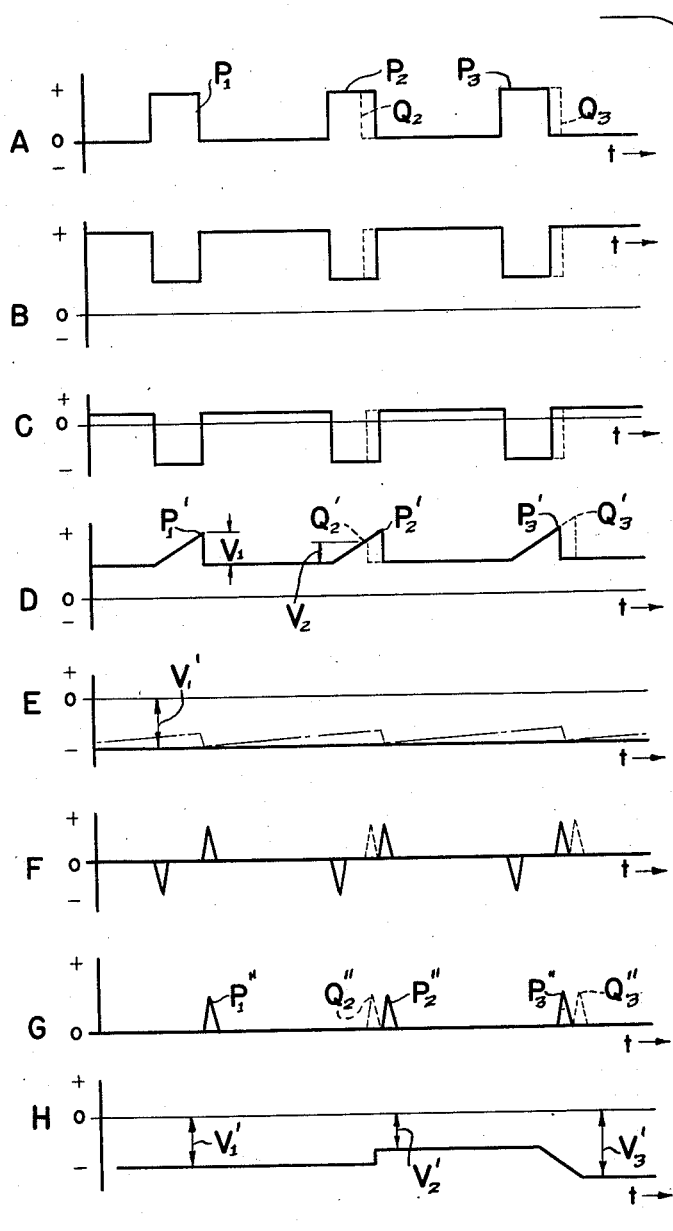
Figure 2 is a series of curves useful in explaining the operation of the invention.

Referring to the appended drawings, input terminals are shown at 1 and 2 to which is applied a square wave such as shown at A in Figure 2. This square wave may have its pulse duration (also known as the "marking" state) varied in accordance with one intelligence, while the pulse separation ("spacing" state) is varied by an independent intelligence. The solid line curve at A in Figure 2 represents a signal having unvarying intelligence, while the dotted line curve indicates modifications of the wave form characteristic of a varying intelligence signal.

The signal applied at input terminals 1, 2 is fed thereby to the left half of the limiting amplifier stage 5 which produces in its output lead 6 a wave form such as shown at B in Figure 2, similar to wave form A but inverted in polarity. The right section of amplifier 5 constitutes a grounded grid cathode-coupled amplifier forming a phase inverter. For a more detailed discussion of this type of phase inverter reference is made to the article "Cathode Phase Inversion" by Otto H. Schmitt, published in the November 1941 issue of the Review of Scientific Instruments. The output of the phase inverter stage will be similar in wave form to wave A of Figure 2, but superposed upon an unvarying direct voltage. Limiting stage amplifier 5 therefore provides two separate signals of opposite phase but similar wave form. These two waves are fed by conventional capacitance-resistance coupling to the respective grids of the double triode tube 15 across the anode-to-cathode paths of which are connected respective condensers whereby this tube acts as a pair of integrators for integrating the wave forms supplied thereto. These integrators are shown and described in my Patent No. 2,419,292, granted April 22, 1947, on an application filed November 15, 1944.

The wave form supplied to the right grid of tube 15 is shown at C in Figure 2, and the integrated wave form produced by the right section of integrator tube 15, and appearing at lead $f_2$ is shown at D. It will be appreciated that during the negative portions of the voltage applied to the grid of the right integrator tube section, this section is cut-off so that the integrating condenser is charged up through the anode resistor to a value dependent upon the length of time that the tube section is cut-off. As soon as the grid of this section is positively excited, it becomes conductive and the condenser immediately discharges to the value determined by the difference between the applied plate supply voltage and the volt-drop in the anode resistor. The condenser voltage then remains at this value until the grid is once more negatively excited when the condenser begins to charge up toward the plate supply voltage value. As shown in Figure 2 by the solid line curve D, when the pulses or marks of the input square wave A have constant duration the charging peaks have constant amplitude. However, for smaller or larger pulse (mark) duration, as shown by the dotted line curves at A, B, C, and D of Figure 2, the charging peaks will have correspondingly smaller or larger amplitudes.

The two integrated voltages produced by the two sections of tube 15 are applied to respective peak-to-peak detector circuits, only one of which is shown in this figure, connected to the lead $f_2$. It will be understood that a similar circuit is connected to the lead $f_1$. This integrated voltage (shown at D in Figure 2) is supplied to a peak-to-peak detector circuit having an input circuit formed by a condenser 16 in series with a resistor 17 across which is connected one diode of a double diode tube 12. The other diode of tube 12 is in series with the first diode, and the output terminals 3, 4 are connected across the two series-connected diodes, and have an output condenser 11 connected thereacross, In one form of peak-to-peak detector circuit, condenser 11 is shunted by a resistor enabling the condenser voltage to follow both increases and decreases in the input voltage being detected. Such a resistor causes the output voltage at terminals 3 and 4 in response to uniform-duration input pulses to appear as shown in the dash-dot curve at E of Figure 2. Thus, between peaks of the wave form at D the condenser discharges slightly and then becomes recharged by the succeeding peak. This ripple thus produced is highly undesirable in many systems, the desired wave form under constant input pulse duration being shown by the solid line at E of Figure 2.

In order to correct this situation, the present invention includes further circuit elements which substantially overcome this ripple. Thus, also connected to the lead 6 (which carries a voltage of the form shown at B of Figure 2) is a differentiating circuit comprising condenser 7 and resistor 8. The voltage across resistor 8 will then have the wave form shown at F in Figure 2, consisting of negative and positive pulses at the beginning and end of each pulse of curve B. A polarity-selecting diode 9 is connected in series with a load resistor 21 across the differentiating network resistor 8, and resistor 21 is connected in series with a neon tube 10 and a further current-limiting resistor 22 across the condenser 11 forming part of the peak-to-peak detector.

Diode 9 and its resistor 21 serve to eliminate the negative pulses of the wave at F, producing the wave at G having only positive pulses occurring simultaneously with the peaks on the input wave to the detector circuit, illustrated at D in Figure 2. As these peaks shift in time, corresponding to the shift in duration of the input wave "marking" state shown at A, the pulses of the wave form at G shift similarly, as shown by the dotted lines at G. Thus each input square pulse $P_1$, $P_2$, $P_3$ at terminals 1, 2 produces a corresponding pulse peak $P_1'$, $P_2'$, $P_3'$ at lead $f_2$, each of amplitude representing the duration of the corresponding input pulse. Simultaneously with the peak of each pulse $P_1'$, $P_2'$, $P_3'$ is produced a derivative pulse $P_1''$, $P_2''$, $P_3''$ applied to neon tube 10.

The function of the neon tube 10 and its circuit is to break down and conduct current to discharge condenser 11 at the moment that the peak of wave D is applied to condenser 11 through diodes 12 by way of lead 13. If it be assumed that at some moment the condenser 11 has a voltage $V_1'$ as shown in curve E which corresponds to the peak-to-peak voltage $V_1$ of the succeeding peak $P_1'$ of curve D, then the neon tube 10 upon breaking down in response to the differentiated pulse $P_1''$ will have no effect on the condenser voltage, since any discharge effect which it may have on the condenser is compensated for by the charging effect of the peak $P_1'$ of wave D supplied through the diodes 12 to the condenser 11. Accordingly, the condenser voltage remains at the same value $V_1'$ during the interval subsequent to the pulses $P_1$, $P_1'$, $P_1''$. If each of the succeeding input pulses $P_2$, $P_3$ etc., has the same duration, producing the same peak values $P_2'$, $P_3'$ etc. for the integrated version thereof shown at D, the condenser voltage 11 will remain at the desired uniform value, as shown by the solid line curve at E of Figure 2, since there is nothing to discharge the condenser, it having no discharge path. It will be understood that the tube 10 immediately opens its circuit at the end of the derivative pulse $P_1$ so that it has no effect on the condenser circuit until the next pulse $P_2$.

However, if the next input pulse has shorter duration, as shown by the dotted square pulse $Q_2$ at A, the integrated pulse $Q_2'$ at C will have a smaller amplitude $V_2$. Then, when the differentiated pulse $Q_2''$ occurs simultaneously with the peak of the integrated pulse $Q_2'$ of curve C, the condenser will have a larger voltage than the voltage which the pulse $Q_2'$ tends to produce on it. The neon tube upon breaking down in response to the pulse $Q_2''$ then discharges the condenser 11 almost instantaneously through resistors 21, 22 until the condenser voltage equals the value $V_2'$ corresponding to the amplitude $V_2$ of pulse $Q_2'$ as shown in the dotted curve H of Figure 2. The time constant of the circuit constituting condenser 11 and resistors 22 and 21 is selected so as to cause this decrease in condenser 11 voltage to occur substantially instantaneously during the brief interval when the neon tube is broken down to close the discharge circuit. Immediately thereafter, however, the neon tube goes out and opens the condenser discharge circuit so that the voltage of the condenser remains at its new value $V_2'$ until the next initiating pulse $Q_3$.

In the illustration shown, the next pulse $Q_3$ shown at dotted lines in curves A and C has a longer duration, producing a higher peak $Q_3'$ for its integrated form. Accordingly, this pulse peak $Q_3'$ charges the condenser 11 to a higher value shown at $V_3'$ in curve H. The short-circuiting of the neon tube by the differentiated pulse $Q_3''$ has no effect on the condenser voltage, in the same manner as discussed above with respect to pulse $P_1$.

In this way, the output condenser voltage is maintained substantially uniform in the interval between peaks of the integrated pulses $Q_2'$, $Q_3'$ etc. and follows changes in amplitude of these integrated pulses substantially instantaneously both as to increases or decreases in their amplitude, corresponding to changes in duration of the input pulses $Q_2$, $Q_3$. The over-all wave form of the output voltage for constant input pulse duration (constant marking) is as shown by the solid line in curve E, and for varying input pulse duration exemplifying varying intelligence is shown by the curve H, in both of which the former ripple shown by the dash-dot curve E has been substantially eliminated. An output circuit is therefore provided for the detector having substantially infinite time constant, but which follows faithfully the varying amplitude of the integrated pulses $Q_2'$, $Q_3'$ etc. supplied thereto by virtue of the neon tube circuit just described.

It should be noted that the only ripple present is that ripple due to a change of the function taking place during the cycle. It should also be noted that this device is capable of measuring independently the peak to peak voltage of each and every individual cycle.

Utilizing the above described scheme or expedient it has been made possible to use relatively low frequency square wave intelligence in an electroscriber capable of writing fairly rapid messages. This type of peak to peak voltmeter or time interval measuring device may have other application which I will not describe here.

It will be obvious to those skilled in the art that my invention is capable of various modifications and I do not therefore desire to be restricted to the various details shown but only within the scope of the appended claims.

What is claimed is:

1. A time interval measuring device comprising three diodes connected in series, the anode of the third diode being connected to the cathode of the second diode and the anode of the second diode being connected to the cathode of the first diode, and a gaseous tube connected between said second anode and said first cathode.

2. A peak-to-peak detector circuit comprising a peak-to-peak detector having a pair of serially connected electron discharge tubes, an input circuit coupled to one of said tubes, an output circuit coupled across both said tubes, said output circuit consisting of an unbypassed condenser, in combination with means for substantially instantaneously discharging said condenser to a voltage corresponding to the amplitude of each pulse being detected at the instant at which the peak value of said pulse occurs.

3. A peak-to-peak detector circuit arrange for detecting the peak-to-peak amplitude of an input pulse wave, comprising a pair of series-connected rectifiers, means coupling said input wave across one of said rectifiers in series with a capacitance, said one rectifier being shunted by a resistance, a pair of output terminals, coupled across said series-connected rectifiers, an unbypassed condenser connected across said output terminals, and means responsive to an input pulse peak of a value less than the voltage across said condenser for discharging said condenser at the instant of occurrence of said peak to a lower voltage corresponding to said pulse peak.

4. A circuit arrangement as in claim 3 wherein said last-named means comprises means for producing a short duration pulse of predetermined polarity at the instant of occurrence of said pulse peak, a normally open discharging circuit connected across said condenser, and means responsive to said short duration pulse for closing said discharge circuit only for the duration of said short duration pulse.

5. A peak-to-peak detector circuit arrangement for an input wave having a series of time-separated pulse peaks comprising a detector circuit having an unbypassed condenser in its output circuit, means for producing a short pulse concurrent with the occurrence of each peak of said input wave, a neon tube connected across said condenser, and means for rendering said neon tube conductive in response to said short pulse, whereby said condenser is caused to discharge through said neon tube to a value corresponding to the peak of said input wave when said peak is less than said condenser voltage.

6. In combination, a peak-to-peak detector comprising a pair of serially connected electron discharge tubes, an input circuit coupled to one of said tubes, an output circuit coupled across both said tubes, an unbypassed condenser connected across said output circuit, means for producing a short pulse at each of the peaks of predetermined polarity of the wave to be detected, a normally open discharge circuit coupled across said condenser, and means for closing said discharge circuit in response to each said short pulse and solely for the duration of said each short pulse.

7. Apparatus as in claim 6 wherein said discharge circuit comprises a resistor in series with a pulse-operated gas discharge tube.

8. Apparatus as in claim 7 wherein said discharge tube is a cold-cathode neon tube.

9. In combination, a peak to-peak detector circuit including a pair of serially connected tubes and an unbypassed condenser coupled across both said tubes and forming the output circuit of said detector circuit whereby said condenser is charged to a voltage value corresponding to the largest peak-to-peak excursion of the wave to be detected and normally cannot decrease its voltage from said value, and means responsive to a peak-to-peak excursion of less than said largest value for discharging said condenser to a lower voltage corresponding to said lesser peak-to-peak excursion.

10. Apparatus as in claim 9 wherein said last named means comprises a neon tube coupled across said output circuit, and means for breaking down said neon tube only during peaks of said input wave of predetermined polarity.

11. A peak-to-peak pulse wave detector circuit comprising a peak-to-peak detector comprising a pair of serially connected tubes and having an output circuit coupled across both said tubes and comprising an unbypassed condenser, a normally open-circuited discharge path for said condenser, and means for closing the circuit of said discharge path simultaneously with the occurrence of each pulse being detected.

FRANCIS H. SHEPARD, Jr.

REFERENCES CITED

The following references are of record in the file of this patent:

UNITED STATES PATENTS

| Number | Name | Date |
|---|---|---|
| 1,817,765 | Rex | Aug. 4, 1931 |
| 2,137,846 | Klutke | Nov. 22, 1938 |
| 2,218,629 | Swart | Oct. 22, 1940 |
| 2,222,759 | Burnside | Nov. 26, 1940 |
| 2,284,101 | Robins | May 26, 1942 |
| 2,307,316 | Wolff | Jan. 5, 1943 |
| 2,335,265 | Dodington | Nov. 30, 1943 |

OTHER REFERENCES

"The Full Wave Voltage Doubling Rectifier Circuit," by Waidlich in Proceedings of the Institute of Radio Engineers, vol. 29, No. 11, October 1941, pages 554–558.

"Vacuum Tube Voltmeters," by Rider copyright 1941, pages 17–21.